UNITED STATES PATENT OFFICE.

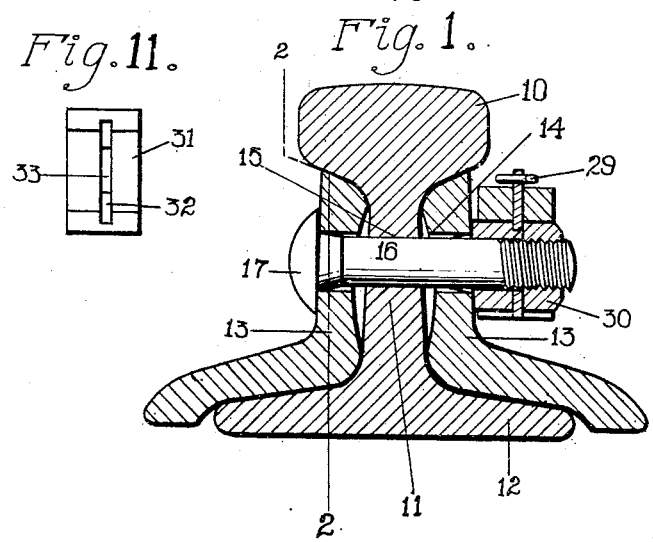

CLAUD H. BARRETT, OF BOONE, IOWA.

NUT-LOCK.

1,246,378.  Specification of Letters Patent.  Patented Nov. 13, 1917.

Application filed February 15, 1917. Serial No. 148,908.

*To all whom it may concern:*

Be it known that I, CLAUD H. BARRETT, a citizen of the United States, and resident of Boone, in the county of Boone and State of Iowa, have invented a certain new and useful Nut-Lock, of which the following is a specification.

The object of my invention is to provide a nut lock of simple and durable construction.

A further object is to provide a nut lock so constructed and arranged that the nut may be locked on a bolt in such a way that the nut may be readily and easily removed when desired.

Still a further object is to provide a bolt and nut so constructed and arranged that they may be securely locked against rotation with relation to each other, and yet having parts so arranged that the nut may be readily and easily removed from the bolt when desired.

Still a further object is to provide such a bolt and nut peculiarly adapted for use for locking the fish plates at a railroad rail joint.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a transverse, vertical, sectional view through a railroad rail with fish plates on opposite sides thereof locked to the rail by means of a bolt and nut and locking device embodying my invention.

Fig. 2 shows a vertical, sectional view, taken on the line 2—2 of Fig. 1.

Fig. 3 shows a side elevation of the rails showing the end of a bolt on which the nut and locking mechanism are placed.

Fig. 4 shows a vertical, sectional view through a bolt, taken adjacent to the fish plate and through a portion of the locking washer.

Fig. 5 is a side elevation of the bolt.

Fig. 6 is an end elevation of the same, taken from the screw-threaded end.

Fig. 7 is what may be called a rear elevation of the washer viewed from the side which is adjacent to the head of the bolt.

Fig. 8 is a similar view taken from the opposite side of the washer.

Fig. 9 is a side elevation of said washer.

Fig. 10 is what might be called a front elevation of the flange device which is mounted on the washer, and Fig. 11 shows an inverted plan view of the locking yoke.

In the illustration of my invention shown in the accompanying drawings, I have used the reference numeral 10 to indicate generally the ball of a rail having the shank 11 and the base 12.

On opposite sides of the rail are the ordinary fish plates 13 having openings 14 which are somewhat oval in shape. The central portions of the openings 14 are alined with the opening 15 through the rail.

I have shown a bolt 16 having at one end a head 17, and on the shank of the bolt adjacent to the head are opposite, laterally extending portions 18, clearly shown in Figs. 2, 5 and 6, adapted to enter the openings 14 in the fish plates and when they are so entered to prevent rotation of the bolt. The end of the plate opposite the head 17 is screw-threaded at 19. The bolt is extended through the two fish plates and the rail, as shown in Fig. 1. On the screw-threaded end thereof is mounted a washer 20 preferably angular in outline having a central opening 21 preferably large enough to slide freely on the bolt, as shown in Figs. 7 to 9 inclusive.

The washer 20 has on one side opposite lugs 22 projecting away from the face of the washer on opposite sides of the opening 21, and adapted to enter the oval opening 14 in the fish plate for preventing rotation of said washer. On the face of the washer 20 opposite the face having the lugs 22, preferably above the opening 21, is an approximately square lug 23 shown in Figs. 8 and 9.

The washer 20 is provided with the flange washer 24 which may be secured or formed on the washer 20 in any suitable way. As illustrated in the drawing, the flange washer 24 has a central opening 25 and is substantially circular in outline and is of such size as to project beyond the sides of the washer 20, as illustrated in Fig. 4, when placed adjacent to said washer 20 with the lug 23 received in the recess 26 off-set from the opening 25, as shown in Fig. 10. It will be seen that the flange washer 24 really simply forms a flange on the washer 20.

At the upper portion of the flange washer 24 is an upward, flat extension 27 through which extends an opening 28 to receive a cotter key or the like 29. The nut 30 of angular outline is screwed on to the bolt 16 until it jams against the flange washer 24, as illustrated in Fig. 1.

I have provided a locking yoke 31 in the form of an inverted U, illustrated in Figs. 1, 3, 4 and 11, having in the inner surfaces of its arms and of the connecting member between the arms, the slots 32. An opening 33 extends from the upper central portion of the slot 32 through the member which connects the arms of the yoke, so that when the yoke is dropped downwardly over the flange washer 14 from above the extension 27 will pass through the slot 33 and the edges of the flange washer 24 at the sides and top thereof will be received in the slots 32. The weight of the locking yoke will hold it in position, and on account of the fact that the members 18 on the bolt and the members 22 on the washer 20 enter the oval openings 14 in the fish plates, it will be obvious that neither bolt nor nut can turn until the locking yoke is removed or until one of the portions 18 or 22 can get out of the openings in the fish plates. The cotter pin 29 may be inserted through the hole 28 if desired, to prevent any accidental removing of the locking yoke.

My improved nut locking device has many important advantages, some of which will be mentioned. My nut lock mechanism is so constructed and arranged that it may be readily released at any time by removing the cotter pin 29 and the locking yoke and thereupon unscrewing the nut 30.

If the bolts after installation should stretch, which is a common occurrence, my locking mechanism can be released, the nut may be tightened on the bolt, and the locking mechanism replaced. At any time, also, when it is desired to remove the nuts and bolts, this can easily be done.

In the ordinary installation of rails some washer is used, so that substantially the only addition which I am obliged to make to the ordinary parts is found in the portions 18 and 22, the flange washer 24 and the locking yoke which can be made at a small expense.

It will be noted that my improved bolt and locking mechanism may be used on iron where the holes in the iron are of the proper shape, or may be used on wood having ordinary round holes bored therein, inasmuch as in the use with wood the members 18 and 22 may be simply forced into the wood. For this purpose the members 18 and 22 are somewhat beveled outwardly from the bolt head 17 and the washer 20, as shown in Figs. 5 and 9.

Some changes may be made in the construction and arrangement of the various parts of my improved locking mechanism, and it is my intention to cover by the claims of the patent to be issued hereon, any modified forms of structure or use of mechanical equivalents which may be within the real spirit of my invention and the reasonable scope of my claims.

I claim as my invention:

1. In a device of the class described, a bolt having a head at one end and a screw-threaded portion at the other, having adjacent to said head a portion projecting laterally from the body of the bolt, a washer for said bolt angular in outline, having on one surface adjacent to said head when installed on the bolt, a projecting portion, a member on said washer having laterally projecting flanges, a nut of angular outline, and a locking yoke having slots for receiving said flanges.

2. In a device of the class described, a bolt having a head at one end and a screw-threaded portion at the other, having adjacent to said head a portion projecting laterally from the body of the bolt, a washer for said bolt angular in outline, having on one surface adjacent to said head when installed on the bolt, a projecting portion, a member on said washer having laterally projecting flanges and an upward extension, a nut of angular outline, and a locking yoke adapted to fit over said washer and nut, having slots for receiving said flanges and an opening to receive said upward extension.

Des Moines, Iowa, January 31, 1917.

CLAUD H. BARRETT.

Copies of this patent may be obtained for five cents each, by addressing the "Commissioner of Patents, Washington, D. C."